United States Patent [19]

Takemura et al.

[11] 4,136,597
[45] Jan. 30, 1979

[54] DRILL SCREW AND DIE FOR PRODUCING SAME

[75] Inventors: Akira Takemura; Tadao Utsumi, both of Kyoto, Japan

[73] Assignee: Kabushiki Kaisha Yamashina Seikosho, Koyto, Japan

[21] Appl. No.: 826,555

[22] Filed: Aug. 22, 1977

[30] Foreign Application Priority Data

Aug. 24, 1976 [JP] Japan .................................. 51/100178

[51] Int. Cl.$^2$ ............................................. F16B 25/00
[52] U.S. Cl. .............................................. 85/41; 10/9; 10/10 R
[58] Field of Search ................... 85/41, 46, 47, 48, 68; 408/227, 228, 229; 10/9, 10 R

[56] References Cited

U.S. PATENT DOCUMENTS

| | | | |
|---|---|---|---|
| 2,572,647 | 10/1951 | Merwin | 408/227 X |
| 2,956,470 | 10/1960 | Knohl | 85/47 |
| 3,079,831 | 3/1963 | Gutshall | 85/47 |
| 3,207,024 | 9/1965 | Sommer | 10/9 X |
| 3,463,045 | 8/1969 | Prescott | 85/41 |
| 3,710,676 | 1/1973 | Ringland | 85/41 |
| 3,937,120 | 2/1976 | Munse | 85/47 |

*Primary Examiner*—Rodney H. Bonck

[57] ABSTRACT

A drill screw is produced by a pinch pointing die comprising a pair of substantially identical drill point forming portions each of which includes a half conical recess, a half cylindrical recess and a half truncated conical recess. The drill screw thus produced comprises, therefore, substantially identical two half drill point portions each of which includes a half conical portion, a half cylindrical portion and a half truncated conical portion.

1 Claim, 9 Drawing Figures

DRILL SCREW AND DIE FOR PRODUCING SAME

BACKGROUND OF THE INVENTION

This invention relates to a drill screw capable of performing a boring operation and to a die for forming a drill point of the drill screw.

Drill screws can be broadly classified into two types according to the method for producing the same. One type of drill screws have their drill points formed by milling or other machining operation, and the other type of drill screws have their drill points formed by forging or pinch pointing. This invention relates to a drill screw produced by the latter method, and to a pinch pointing die used for the production of the drill screw according to the invention.

SUMMARY OF THE INVENTION

The invention has as its object the provision of a drill screw having a superb boring function and being low in cost, and of a die for producing such drill screw which die can be manufactured readily because its shape is simplified as contrasted to dies of the prior art which have hitherto been complex in construction.

To this and other ends, the present invention contemplates the provision of a drill screw comprising a head having a rotation tool engaging means, a threaded portion and a drill point portion, such drill screw being characterized in that said drill point portion consists of substantially identical two half drill point portions each of which includes a half conical portion, a half cylindrical portion and a half truncated conical portion produced by equal division and arranged successively from the forward end of each drill point portion, said two half drill point portions being juxtaposed against each other in such a manner that their center axes are inclined in opposite directions through the same angle with respect to the center axis of the drill screw, and the center axes of the two half drill point portions intersecting each other slightly outwardly of the forward ends of the half drill point portions.

Further, the present invention contemplates the provision of a die for producing the drill screw by pinch pointing comprising a pair of substantially identical drill point forming portions each of which includes a half conical recess, a half cylindrical recess and a half truncated conical recess produced by equal division and arranged successively from the forward end of each drill point forming portion, said pair of forming portions being arranged with respect to a workpiece in such a manner that the center axes of the pair of drill point forming portions are inclined in opposite directions through the same angle with respect to the center axis of the workpiece, and the center axes of the pair of drill point forming portions intersect each other at a point slightly outwardly of the forward end of the forming portions.

BRIEF DESCRIPTION OF THE DRAWINGS

A preferred embodiment of the invention will be described with reference to the accompanying drawings, wherein.

DESCRIPTION OF A PREFERRED EMBODIMENT

Figure 1:
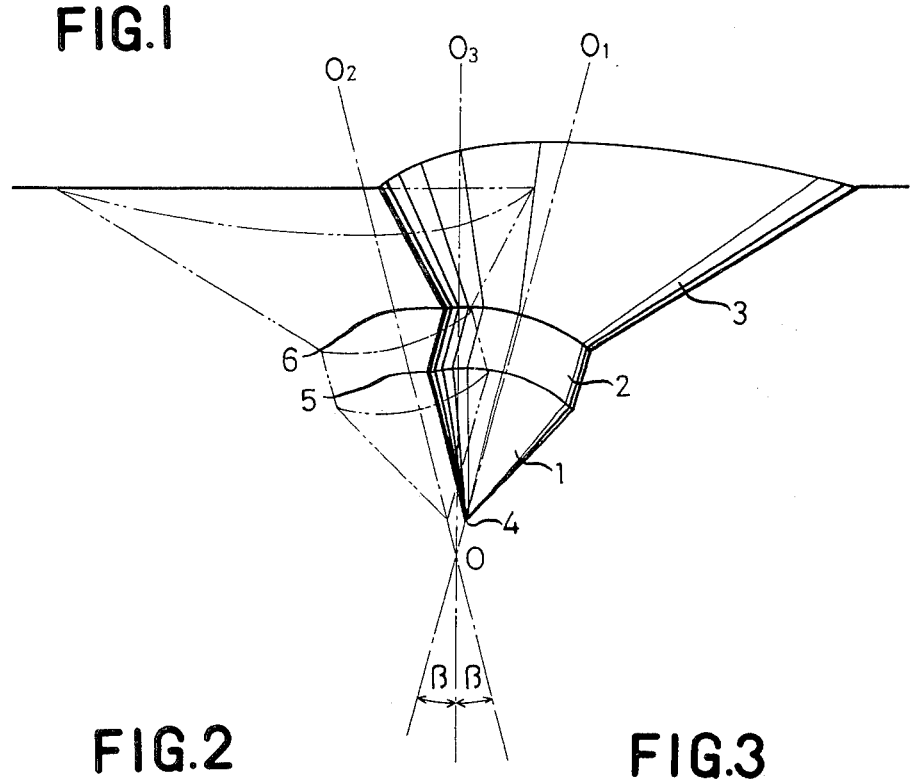
FIG. 1 is a view in explanation of the depressed portion of the pinch pointing die for working on the material according to this invention.
Figure 2:
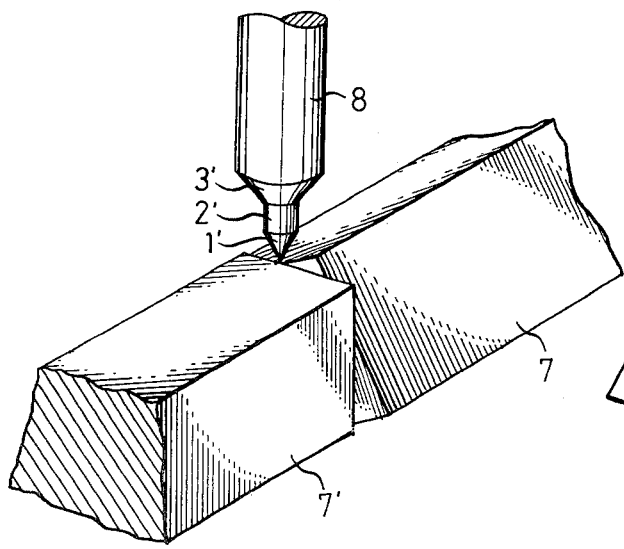
FIG. 2 and FIG. 3 are a perspective view and a side view, respectively, showing the process of production of the die according to the invention.
Figure 3:
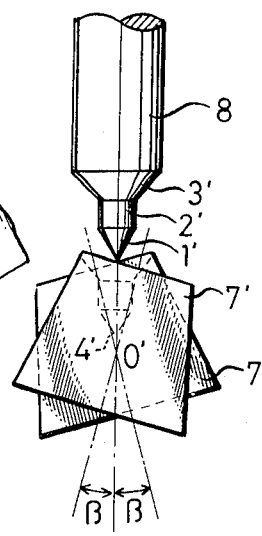

Referring to FIG. 1, the reference numerals 1, 2 and 3 designate depressed surface elements of the die according to the invention which are of a half conical shape, half cylindrical shape and half truncated inclined conical shape, respectively. The elements 1, 2 and 3 have a common center axis $O_1$ and diametrical surfaces disposed in the same plane. These elements 1, 2 and 3 are combined to provide a working recess of the pinch pointing die for forming a drill point. A recess of the identical shape having a center axis $O_2$ is disposed in an inclined position as indicated by dash-and-dot lines in such a manner that the solid line recess and the dash-and-dot line recess are juxtaposed against each other to provide a pair of recesses inclined in opposite directions to form an angle $\beta$ with respect to a center line $O_3$ which forms the center axis of a blank for producing a drill screw as subsequently to be described.

The center axes $O_1$ and $O_2$ of this pair of recesses intersect each other on the center line $O_3$ at a point which is disposed slightly outwardly of a tip 4 of these recesses. The half cylindrical recessed surface element 2 has a diameter which is substantially equal to the diameter of a blank for a drill point of a drill screw subsequently to be described. These characteristics of the shape of the die will more clearly be understood from the following description of the method of production and method of use thereof.

Figure 4:
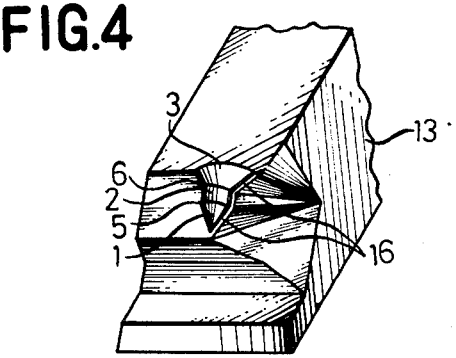
FIG. 4 is a perspective view of the completed die.

In producing the pinch pointing die according to the invention, a working tool, such as a spark erosion machining tool 8, is used which tool includes a conical portion 1', a cylindrical portion 2' and a truncated conical portion 3' corresponding to the aforesaid recess elements. A pair of die blanks 7 and 7' are placed on jigs (not shown) in such a manner that the blanks are disposed in abutting relation at their ends and inclined in opposite directions with respect to the center axis of the tool 8 through an angle $\beta$ at a center point O' of the blanks 7, 7' which is disposed slightly downwardly of a point 4' which is a predetermined tip of the recess to be formed by means of the tool. Thereafter working is effected to a predetermined depth. A die member 13 which has been completed is finished by providing a cutting edge 16 on the inclined side as shown in FIG. 4. The die is then subjected to heat treatment to give thereto strength of a predetermined degree and put to use.

Figure 5:
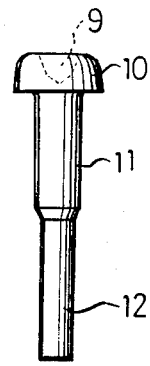
FIG. 5 is a front view of a blank for the drill screw.

The process for producing a drill point by using the pinch pointing die according to the invention will now be described. A blank for a drill screw shown in FIG. 5 is formed by a double heater by means of a known process and includes a head 10 formed with a rotating tool engaging portion, that is, a cross recess 9, a screw portion 11 and a drill point portion 12. The screw portion 11 has a diameter which is substantially equal to the effective diameter of the thread of the drill screw, and the drill point portion is slightly finer than the screw portion 11 or it has a diameter substantially equal to the root diameter of the thread of the drill screw.

Figure 6:
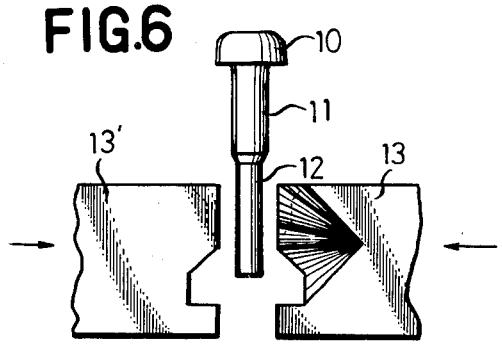
FIG. 6 shows the blank of FIG. 5 before being worked by using the die according to the invention.
Figure 7:
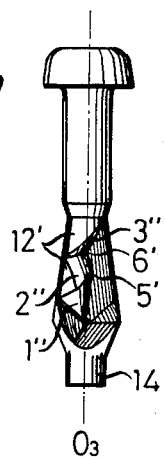
FIG. 7 is a front view of the drill screw according to the invention worked by means of the die but having excess material to be removed.

As shown in FIG. 6, a pair of die members 13 and 13' according to the invention are mounted on a pinch pointer in such a manner that the two die members are aligned in non-inclined relative position and disposed vertically with respect to a drill screw blank. When the two die members are closed, the recesses of the working portion are brought essentially to the aforesaid relative positions. If working is performed in a manner to pinch the drill point portion 12 of the drill screw blank, the blank is shaped such that it conforms to the shapes of the recesses formed on the left and right die members 13, 13'. At the same time, excess material 14 is ready to be removed in the succeeding step as shown in FIG. 7. At this time, inner ridges 5-6 between outer peripheral surfaces of the half cylindrical recess 2 of the die members and the surfaces of the die members have a negative angle with respect to the axis $O_3$ of the drill screw blank when the die members bite into such blank, so that the die members operate in a manner to wrap up the blank to thereby prevent upward movement of the blank during the working process. Thus separation of excess material can be prevented and the blank can be accurately brought into conformity with the shape of inner surfaces of the die members when pressure is applied.

Figure 8:
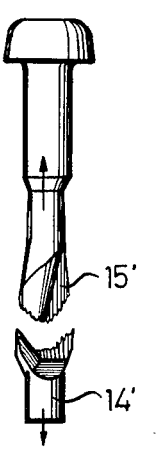
FIG. 8 is a front view of a drill screw of the prior art, showing the manner in which the drill screw is incompletely formed.
Figure 9:
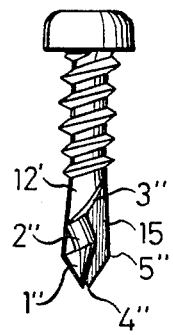
FIG. 9 is a front view of the drill screw according to the invention which is completed by removing excess material.

FIG. 8 shows an example of a blank formed by using die members of the prior art having no half cylindrical recess 2. When such die members are used, the blank and excess material move in opposite directions as the die members begin to bite into the blank. Thus, in some cases, the blank may be shorn before final pressure application is completed. The prior art die members have had a disadvantage in that the cutting edge and forward end portion of the drill point are incompletely formed, thereby markedly reducing the boring performance of the drill screw. When the die according to the invention is used, the excess material 14 still remains unremoved and disposed at the forward end of the drill point even after completion of impression. The excess material 14 can be readily removed by providing an obstacle at the forward end of the drill point when thread forming is performed in the next thread rolling step. Thus the drill screw shown in FIG. 9 can be produced. The drill screw includes, as shown in FIG. 9, a half conical portion 1", a half cylindrical portion 2" and a half truncated conical portion 3" formed by the half conical depressed surface element 1, half cylindrical depressed surface element 2 and half truncated inclined conical depressed surface element 3, respectively. 12' designates a drill point surface which is not brought into contact with the die members.

A drill point formed by the die according to the invention can have a groove 15 of a large dimension for releasing chips therethrough which are produced when a boring operation is performed. This makes it possible to provide tips 4" and cutting edges 4"-5" which are completely formed and sharp. Thus the drill point shows a markedly improved boring performance.

What we claim is:

1. A drill screw comprising a head having a rotating tool engaging means, a threaded portion and a drill point portion, such drill screw being characterized in that said drill point portion consists of substantially identical two half drill point portions each of which includes a half conical portion, a half cylindrical portion and a half truncated conical portion produced be equal division and arranged successively from the forward end of each drill point portion, said two half drill point portions being juxtaposed against each other in such a manner that their center axes are inclined in opposite directions through the same angle with respect to the center axis of the drill screw, and the center axes of the two half drill point portions intersecting each other slightly outwardly of the forward ends of the half drill point portions.

* * * * *